(12) United States Patent
Kuo et al.

(10) Patent No.: US 9,215,015 B2
(45) Date of Patent: Dec. 15, 2015

(54) METHOD FOR SELECTING WIRELESS NETWORK AND PORTABLE ELECTRONIC DEVICE THEREOF

(75) Inventors: Chien-Liang Kuo, Taipei (TW);
Chia-Shin Weng, Chiayi (TW);
Shu-Ping Yang, Taoyuan County (TW);
Wei-Ren Lo, Taipei (TW); Chih-Kuang Lin, New Taipei (TW)

(73) Assignee: HannStar Display Corporation, Taipei (TW)

( * ) Notice: Subject to any disclaimer, the term of this patent is extended or adjusted under 35 U.S.C. 154(b) by 481 days.

(21) Appl. No.: 13/610,915

(22) Filed: Sep. 12, 2012

(65) Prior Publication Data

US 2014/0011532 A1 Jan. 9, 2014

(30) Foreign Application Priority Data

Jul. 5, 2012 (CN) .......................... 2012 1 0233152

(51) Int. Cl.
| | | |
|---|---|---|
| *H04B 17/00* | (2015.01) | |
| *H04M 1/00* | (2006.01) | |
| *H04B 1/38* | (2015.01) | |
| *G06T 15/40* | (2011.01) | |
| *G06T 11/20* | (2006.01) | |
| *H04W 4/00* | (2009.01) | |
| *H04L 12/40* | (2006.01) | |
| *G06F 3/048* | (2013.01) | |
| *G06F 9/44* | (2006.01) | |
| *H04B 17/309* | (2015.01) | |
| *H04W 48/18* | (2009.01) | |
| *H04B 17/23* | (2015.01) | |

(52) U.S. Cl.
CPC ............. *H04B 17/309* (2015.01); *H04W 48/18* (2013.01); *H04B 17/23* (2015.01)

(58) Field of Classification Search
CPC .......... H04B 17/0042; H04B 17/0045; H04B 17/0057; H04B 17/0065; H04B 17/007; H04B 17/23; H04B 17/24; H04B 17/26; H04B 17/309; H04B 17/318; H04B 17/327; H04M 1/72519; H04M 1/72544; H04M 15/00; H04M 15/8044; H04W 36/30; H04W 48/00; H04W 48/08; H04W 48/18; H04W 84/08; H04W 88/02; H04W 88/06; H04W 4/206; H04W 4/24; H04L 67/18; H04L 67/22; H04L 67/24; H04L 12/14; H04L 12/141; H04L 12/1414; G06Q 50/00; G06Q 10/00
USPC ......................... 370/328, 329, 331, 332, 335; 455/67.11, 226.2, 425, 432.1, 435.2, 455/437, 517, 552.1, 566; 340/870.02; 345/421, 440, 440.2; 715/763, 816; 717/170
See application file for complete search history.

(56) References Cited

U.S. PATENT DOCUMENTS 6,999,081 B1 * 2/2006 Lin et al. ..................... 345/440.2
7,315,750 B2 1/2008 Chou et al.
(Continued)

OTHER PUBLICATIONS

"Office Action of European Counterpart Application", issued on Jan. 3, 2014, p. 1-p. 5.

*Primary Examiner* — Yuwen Pan
*Assistant Examiner* — Paul P Tran
(74) *Attorney, Agent, or Firm* — Jianq Chyun IP Office

(57) ABSTRACT

A method for selecting a wireless network and a portable electronic device thereof are provided, and the method for selecting the wireless network includes following steps. A plurality of wireless network signal indicators of at least one wireless network are detected. Moreover, a target wireless network is selected from the at least one wireless network for operating therein according to the wireless network signal indicators.

26 Claims, 8 Drawing Sheets

(56) References Cited

U.S. PATENT DOCUMENTS

| | | | |
|---|---|---|---|
| 8,228,330 B2 * | 7/2012 | Alsbury et al. | 345/440 |
| 8,527,009 B1 * | 9/2013 | Oroskar et al. | 455/566 |
| 8,560,021 B2 * | 10/2013 | Abbott | H04L 67/36 455/418 |
| 2002/0010915 A1 * | 1/2002 | Maeda | 717/11 |
| 2004/0192290 A1 * | 9/2004 | Muthuswamy et al. | 455/425 |
| 2005/0152304 A1 | 7/2005 | Park | |
| 2005/0188331 A1 * | 8/2005 | Shimada | G06F 3/04817 715/816 |
| 2008/0009324 A1 * | 1/2008 | Patel | 455/566 |

\* cited by examiner

METHOD FOR SELECTING WIRELESS NETWORK AND PORTABLE ELECTRONIC DEVICE THEREOF

CROSS-REFERENCE TO RELATED APPLICATION

This application claims the priority benefit of China application serial no. 201210233152.7, filed on Jul. 5, 2012. the entirety of the above-mentioned patent application is hereby incorporated by reference herein and made a part of this specification.

BACKGROUND

1. Technical Field

The invention relates to a method for selecting a wireless network. Particularly, the invention relates to a method for selecting a wireless network according to wireless network signal indicators, and a portable electronic device using the same.

2. Related Art

Along with development of wireless communication technology, a smart phone can use network services through a wireless network as long as it is in a place capable of receiving wireless network signals. Generally, regarding a design of a network accessing function of the smart phone, to save a user's operation, the smart phone generally operates in a predetermined wireless network automatically, or only provides names of the wireless networks that are available for user's selection and corresponding signal strengths.

However, in an actual operation, when the user of the smart phone uses different network services or network applications, the basic requirements thereof on the wireless network are different. For example, if a user of a smart phone only uses the wireless network to send simple messages in most of the time, and views online movies at some specific time, neither of only using a wireless network with a higher wireless network service charge and good transmission quality, or only using another type of wireless network with a lower wireless network service charge and lower transmission quality fully meet the needs of the user for the above network services. Therefore, how to make a decision among a variety of heterogeneous wireless networks according to the user's own needs becomes an important issue of the field required to be researched and developed.

SUMMARY

Accordingly, the invention is directed to a method for selecting a wireless network, by which a user is capable of easily selecting the wireless network according to wireless network signal indicators, so as to greatly improves usage flexibility of a portable electronic device using the wireless network.

The invention is directed to a portable electronic device, through which a user is capable of easily selecting the wireless network according to wireless network signal indicators, so as to greatly improves usage flexibility of the portable electronic device using the wireless network.

The invention provides a method for selecting a wireless network, which is adapted to a portable electronic device, and the method includes following steps. A plurality of wireless network signal indicators of at least one wireless network are detected. Moreover, a target wireless network is selected from the at least one wireless network for operating therein according to the wireless network signal indicators.

In an embodiment of the invention, the method for selecting the wireless network further includes respectively displaying the wireless network signal indicators of the at least one wireless network on a user interface to serve as a reference basis for selecting the target wireless network from the at least one wireless network.

In an embodiment of the invention, the step of respectively displaying the wireless network signal indicators of the at least one wireless network on the user interface includes: regarding each of the at least one wireless network, respectively converting the wireless network signal indicators corresponding to each of the wireless networks into a plurality of corresponding straight bars through calculation or by looking up a corresponding table, and displaying the corresponding straight bars of each of the wireless networks.

In an embodiment of the invention, the step of respectively displaying the wireless network signal indicators of the at least one wireless network on the user interface includes: when at least one specific indicator in the wireless network signal indicators has a feature of the lower value the better, converting the at least one specific indicator into at least one negative developing straight bar, and simultaneously displaying the at least one negative developing straight bar and at least one corresponding straight bar of the other wireless network signal indicators.

In an embodiment of the invention, the step of displaying the corresponding straight bars of each of the wireless networks includes displaying the corresponding straight bars of each of the wireless networks in different colors.

In an embodiment of the invention, the step of displaying the corresponding straight bars of each of the wireless networks includes displaying the corresponding straight bars corresponding to the same wireless network signal indicator of different wireless networks in a same color.

In an embodiment of the invention, the step of respectively displaying the wireless network signal indicators of the at least one wireless network on the user interface includes: regarding each of the at least one wireless network, respectively converting the wireless network signal indicators corresponding to each of the wireless networks into a plurality of corresponding color points or a plurality of color blocks through calculation or by looking up a corresponding table, and displaying the corresponding color points or color blocks of each of the wireless networks.

In an embodiment of the invention, the step of respectively displaying the wireless network signal indicators of the at least one wireless network on the user interface includes: regarding each of the at least one wireless network, respectively converting the wireless network signal indicators corresponding to each of the wireless networks into a plurality of linear values through calculation or by looking up a corresponding table, and displaying the linear values corresponding to each of the wireless networks in a radar chart.

In an embodiment of the invention, the step of selecting the target wireless network from the at least one wireless networks for operating therein according to the wireless network signal indicators includes: receiving a selection operation, and selecting to operate in the target wireless network according to the selection operation.

In an embodiment of the invention, the step of selecting the target wireless network from the at least one wireless networks for operating therein according to the wireless network signal indicators includes: respectively setting at least one decision threshold and a decision priority sequence corresponding to the wireless network signal indicators; and sequentially comparing the wireless network signal indicators with the at least one decision threshold according to the decision priority sequence, so as to obtain at least one recommended wireless network.

In an embodiment of the invention, the step of sequentially comparing the wireless network signal indicators with the at least one decision threshold according to the decision priority sequence, so as to obtain the at least one recommended wireless network includes: randomly retaining one of the recommended wireless networks when a number of the obtained at least one recommended wireless network is greater than one.

In an embodiment of the invention, the method for selecting the wireless network further includes: displaying a selection prompt corresponding to the recommended wireless network in a semi-manual mode.

In an embodiment of the invention, the step of selecting the target wireless network from the at least one wireless networks for operating therein according to the wireless network signal indicators includes: receiving a confirmation operation or a cancel operation in an automatic mode; selecting the recommended wireless network as the target wireless network when the confirmation operation is received; and cancelling the operation of selecting the recommended wireless network as the target wireless network when the cancel operation is received.

In an embodiment of the invention, the method for selecting the wireless network further includes: displaying a unit operation price of the currently used target wireless network.

In an embodiment of the invention, the method for selecting the wireless network further includes: displaying an operation time threshold corresponding to the target wireless network, and displaying an accumulated time of data transmission performed through the target wireless network.

In an embodiment of the invention, the method for selecting the wireless network further includes: displaying a unit operation price of the currently used target wireless network, and displaying a total accumulated cost of data transmission performed through the target wireless network.

In an embodiment of the invention, the at least one wireless network is at least one of third generation wireless communication technique (3G), Bluetooth, general packet radio service (GPRS), high speed downlink packet access (HSDPA), high speed uplink packet access (HSUPA), radio frequency identification (RFID), wireless-fidelity (Wi-Fi) and third generation partnership project long term evolution (3GPP LTE) technique.

In an embodiment of the invention, the wireless network signal indicators include a bandwidth (BW) indicator, a received signal strength indicator (RSSI), a signal-to-noise ratio (SNR) indicator, a bit error rate (BER) indicator, a packet loss rate (PLR) indicator, or a unit price (UP) indicator.

In an embodiment of the invention, the BW indicator, the RSSI or the SNR indicator are included in a first indicator group, and the BER indicator, the PLR indicator or the UP indicator are included in a second indicator group.

The invention provides a portable electronic device including a multi-mode transceiver unit and a control unit. The multi-mode transceiver unit detects a plurality of wireless network signal indicators of at least one wireless network. The control unit is coupled to the multi-mode transceiver unit, and controls the multi-mode transceiver unit to select a target wireless network from the at least one wireless network for operating therein according to the wireless network signal indicators.

In an embodiment of the invention, the portable electronic device further includes a display unit. The display unit is coupled to the control unit, and displays a user interface, where the control unit displays the wireless network signal indicators on the user interface to serve as a reference basis for selecting the target wireless network from the at least one wireless network.

In an embodiment of the invention, the portable electronic device further includes an input unit. The input unit receives a selection operation, and transmits the selection operation to the control unit. Moreover, the control unit selects to operate in the target wireless network according to the selection operation.

In an embodiment of the invention, the control unit respectively sets at least one decision threshold and a decision priority sequence corresponding to the wireless network signal indicators. Moreover, the control unit sequentially compares the wireless network signal indicators with the at least one decision threshold according to the decision priority sequence, so as to obtain at least one recommended wireless network.

In an embodiment of the invention, when a number of the obtained at least one recommended wireless network is greater than one, the control unit randomly retains one of the recommended wireless networks.

In an embodiment of the invention, the control unit controls the display unit to display a selection prompt corresponding to the recommended wireless network in a semi-manual mode.

In an embodiment of the invention, when the control unit receives a confirmation operation in an automatic mode, the control unit controls the multi-mode transceiver unit to select the recommended wireless network as the target wireless network. Moreover, when the control unit receives a cancel operation in the automatic mode, the control unit controls the multi-mode transceiver unit to cancel the operation of selecting the recommended wireless network as the target wireless network.

According to the above descriptions, in the method for selecting a wireless network and the portable electronic device provided by the embodiments of the invention, by displaying a plurality of the wireless network signal indicators of the wireless networks on the user interface, the user can select to operate the portable electronic device in a target wireless network according to the wireless network signal indicators. In this way, the user can make a decision between the wireless network signal indicators corresponding to the wireless networks according to a habit of using the portable electronic device, and select a suitable wireless network for usage. In this way, usage flexibility of the portable electronic device using the wireless network is greatly improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

An embodiment of the invention provides a method for selecting a wireless network, by which a user can flexibly select a wireless network service for a portable electronic device according to user's own needs. According to the method for selecting the wireless network, when the user of a mobile device uses a mobile roaming service or a wireless network service, the user can select a suitable wireless network according to a plurality of indicators provided by the currently used wireless network, for example, a bandwidth (BW) indicator, a received signal strength indicator (RSSI), a signal-to-noise ratio (SNR) indicator, a bit error rate (BER) indicator, a packet loss rate (PLR) indicator, or a unit price (UP) indicator (which is, for example, an Internet access charge per second).

First Embodiment

Figure 1:
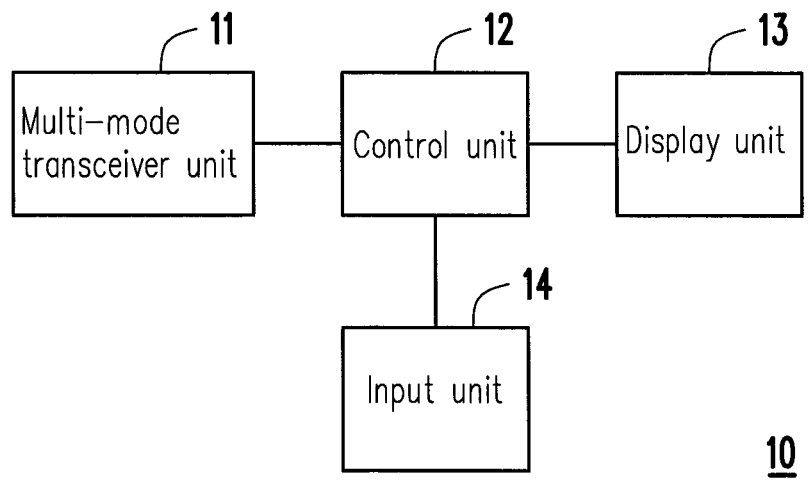
FIG. 1 is a functional block diagram of a portable electronic device according to a first embodiment of the invention.

FIG. 1 is a functional block diagram of a portable electronic device according to the first embodiment of the invention. Referring to FIG. 1, the portable electronic device 10 includes at least a multi-mode transceiver unit 11 and a control unit 12. In the present embodiment, the portable electronic device 10 can be a smart phone, a tablet computer or a notebook computer that has a mobile Internet access function.

The multi-mode transceiver unit 11 detects a plurality of wireless network signal indicators of one or a plurality of wireless networks. In the present embodiment, the wireless network is, for example, at least one of third generation wireless communication technique (3G), Bluetooth, general packet radio service (GPRS), high speed downlink packet access (HSDPA), high speed uplink packet access (HSUPA), radio frequency identification (RFID), wireless-fidelity (Wi-Fi) and third generation partnership project long term evolution (3GPP LTE) technique, etc., which is not limited by the invention.

In the present embodiment, the wireless network signal indicator is, for example, an indicator capable of representing a feature of the wireless network such as a BW indicator, a RSSI, an SNR indicator, a BER indicator, a PLR indicator, or a unit price indicator (for example, an Internet access charge per second, or a charge for uploading/downloading packets per unit time).

In the present embodiment, the multi-mode transceiver unit 11 can be implemented by an electronic circuit capable of using antennas or a radio frequency (RF) circuit to transceive wireless signals in collaboration with a wireless network signal processing module used for analysing the received wireless network signal indicators, and implementation of the multi-mode transceiver unit 11 is not limited by the invention.

The control unit 12 is coupled to the multi-mode transceiver unit 11, and controls the multi-mode transceiver unit 11 to select a target wireless network from the one or plural wireless networks according to the wireless network signal indicators obtained by the multi-mode transceiver unit 11. In the present embodiment, the control unit 12 can be a microcontroller, an embedded controller or a central processing unit (CPU), etc., though the invention is not limited thereto.

In the present embodiment, the portable electronic device 10 further includes a display unit 13 and an input unit 14. The display unit 13 is coupled to the control unit 12, and displays a user interface. In this way, the control unit 12 displays (or controls the display unit 13 to display) the wireless network signal indicators on the user interface to serve as a reference basis for selecting the target wireless network from the one or plural wireless networks. The input unit 14 is coupled to the control unit 12, and receives a selection operation from the user, and transmits the selection operation to the control unit 12, so that the control unit 12 selects to operate in the target wireless network according to the selection operation.

In the present embodiment, the display unit 13 and the input unit 14 can be respectively a general display screen and a keyboard (or a touch panel), or the display unit 13 and the input unit 14 are integrated as a touch display screen. The input unit 14 may also receive a face expression, a gesture or a user voice command, etc., which is not limited to the input method of finger touch.

Figure 2:
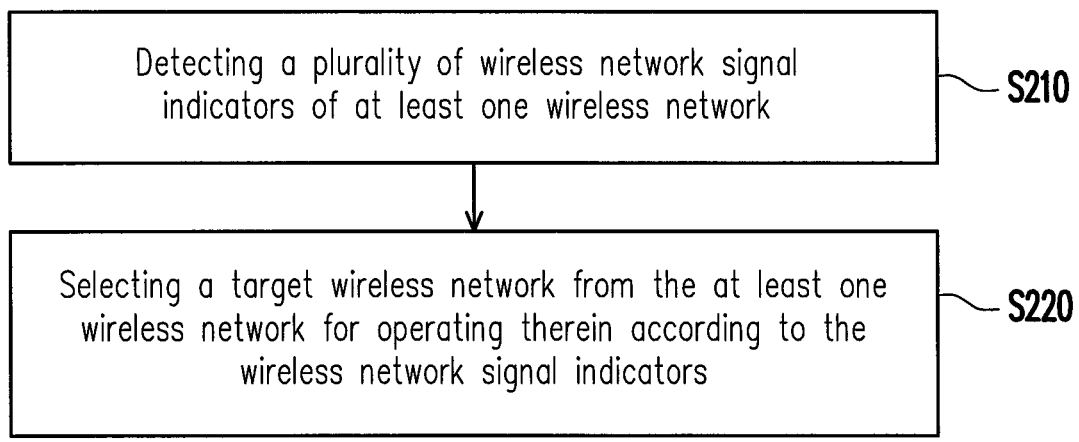
FIG. 2 is a flowchart illustrating a method for selecting a wireless network according to the first embodiment of the invention.

FIG. 2 is a flowchart illustrating a method for selecting a wireless network according to the first embodiment of the invention. Referring to FIG. 2, in step S210, the portable electronic device detects a plurality of current wireless network signal indicators of one or a plurality of wireless networks. It should be noticed that for simplicity's sake, 3G, Bluetooth, GPRS and HSDPA are taken as examples of the wireless network in multiple embodiments of the invention, and the RSSI, UP, BW and SNR indicators are taken as examples of the wireless network signal indicator for descriptions.

In step S220, the portable electronic device selects a target wireless network from the one or plural wireless networks to serve as an operating wireless network of the portable electronic device according to the wireless network signal indicators. In other words, according to the wireless network signal indicators, the user or the portable electronic device itself can easily select the required wireless network. For example, if the user wants to use a smart phone to view online movies, the user probably selects a wireless network capable of providing a maximum bandwidth without selecting a wireless network with a lowest BER, so as to enhance smoothness of a played movie.

In order to easily learn the wireless network signal indicators of each of the wireless networks, in a second embodiment of the invention, the user interface respectively displays the wireless network signal indicators corresponding to each of the wireless networks to serve as a basis for selecting the target wireless network.

Second Embodiment

A hardware device and an operation method of the present embodiment are substantially similar to that of the first embodiment, so that details thereof are not repeated. A difference between the present embodiment and the first embodiment is that in the present embodiment, regarding each of the wireless networks detected by the multi-mode transceiver unit, the control unit respectively converts the corresponding wireless network signal indicators thereof into a plurality of corresponding straight bars through calculation or by looking up a corresponding table, and displays the corresponding straight bars of each of the wireless networks. For example, the portable electronic device continuously detects 3G signals, and converts the RSSI, UP, BW and SNR indicators of the detected 3G signals into corresponding values, and presents the converted values through predetermined corresponding straight bars.

Figure 3:
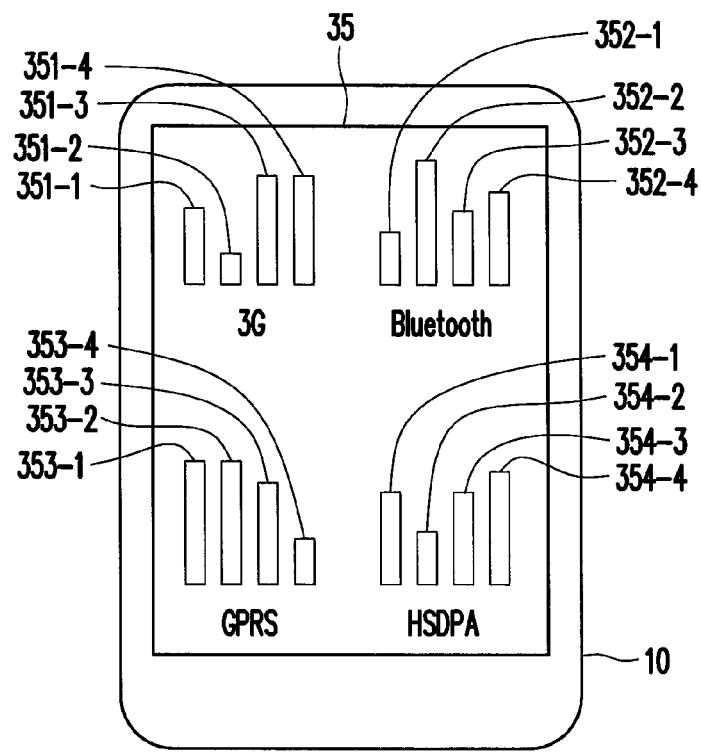
FIG. 3 is a schematic diagram of displaying wireless network signal indicators on a user interface according to a second embodiment of the invention.

FIG. 3 is a schematic diagram of displaying wireless network signal indicators on a user interface according to the second embodiment of the invention. Referring to FIG. 3, in the user interface 35 of the portable electronic device 10, the RSSI, UP, BW and SNR indicators of 3G are respectively represented by corresponding straight bars 351-1~351-4; the RSSI, UP, BW and SNR indicators of Bluetooth are respectively represented by corresponding straight bars 352-1~352-4; the RSSI, UP, BW and SNR indicators of GPRS are respectively represented by corresponding straight bars 353-1~353-4; and the RSSI, UP, BW and SNR indicators of HSDPA are respectively represented by corresponding straight bars 354-1~354-4. In this way, the user can easily learn the plural wireless network signal indicators of the wireless networks currently detected by the portable electronic device, and can select a wireless network (i.e. the target wireless network) suitable for a current operation according to the wireless network signal indicators. For example, if the RSSI indicator of GRPS in the column chart is the largest, and the user just wants to perform a short distance document transmission, the user can directly click to select "GRPS" on the use interface 35 to select the GRPS wireless network for usage.

It should be noticed that in the present embodiment, the longer corresponding straight bar represents a greater value of the corresponding wireless network signal indicator. Generally, the greater the RSSI, BW and SNR indicators of the wireless network are, the better quality the wireless network has, and the higher the UP value of the wireless network is. In other words, if the wireless network indicators are presented according to the method of the second embodiment, the user is probably misled by an appearance of the UP straight bar to select and use an expensive wireless network without careful confirmation.

Therefore, in a third embodiment of the invention, the corresponding straight bars of the wireless network signal indicators can be presented in a practical point of view. In other words, in the third embodiment of the invention, the corresponding straight bar of the wireless network signal indicator with a feature of the smaller value the better (for example, the UP indicator) is presented by a corresponding straight bar having significance opposite to the value thereof, so as to clearly present the wireless network signal indicator with the feature of the smaller value the better. An embodiment of converting the wireless network signal indicator with the feature of the smaller value the better is described in detail below.

It is assumed that the control unit obtains an UP value of 3G, an UP value of Bluetooth, an UP value of GPRS and an UP value of HSDPA to be 0.5 NTD/per unit time, 0.01 NTD/per unit time, 0.2 NTD/per unit time, and 0.75 NTD/per unit time. Then, the control unit selects a temporary UP value, for example, 0.8 NTD/per unit time. Then, the control unit respectively subtracts the UP value of 3G, the UP value of Bluetooth, the UP value of GPRS and the UP value of HSDPA from the temporary UP value to serve as converted UP values, and the converted UP value of 3G is 0.3 NTD/per unit time, the converted UP value of Bluetooth is 0.79 NTD/per unit time, the converted UP value of GPRS is 0.6 NTD/per unit time, and the converted UP value of HSDPA is 0.05 NTD/per unit time. In this way, when the converted UP values of the wireless networks are presented in the user interface 35 of the portable electronic device 10, all of the wireless network signal indicators present a feature of the higher value the better, and user's confusion in determining the wireless network signal indicators is avoided.

Third Embodiment

A hardware device and an operation method of the present embodiment are substantially similar to that of the second embodiment, so that details thereof are not repeated. A difference between the present embodiment and the second embodiment is that in the present embodiment, when a specific indicator in a plurality of the wireless network signal indicators has the feature of the lower value the better (or, the smaller value the better), the portable electronic device converts a value of the specific indicator into a contrast value having an opposite significance (i.e. a greater value is converted into a smaller value), so that the corresponding straight bar may present the feature of the lower the better of the specific indicator.

Figure 4:
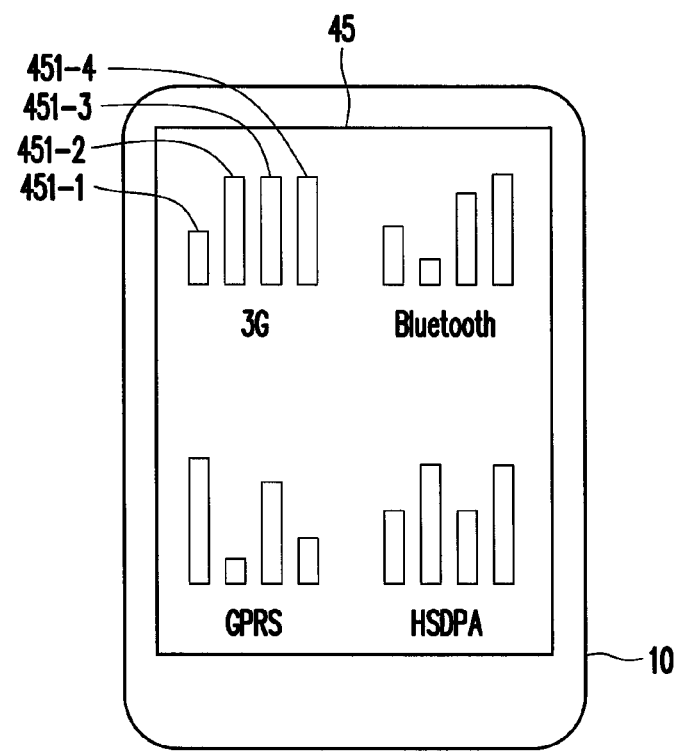
FIG. 4 is a schematic diagram of displaying wireless network signal indicators on a user interface according to a third embodiment of the invention.

FIG. 4 is a schematic diagram of displaying wireless network signal indicators on a user interface according to the third embodiment of the invention. In the user interface 45 of the portable electronic device 10, the 3G wireless network is taken as an example for descriptions. Since the RSSI, BW and SNR indicators of the wireless network are the greater the better, corresponding straight bars 451-1, 451-3 and 451-4 of the RSSI, BW and SNR indicators of 3G are the same to the corresponding straight bars 351-1, 351-3 and 351-4 of FIG. 3. However, because the UP indicator of the wireless network is the smaller the better, the corresponding straight bar 451-2 of the UP indicator of 3G is presented by the converted corresponding straight bar 451-2 having the opposite significance. In other words, the longer the corresponding straight bar 451-2 is, the lower the unit price of 3G is. In this way, the presenting methods of good and bad of the corresponding straight bars can be united (i.e. the longer the corresponding straight bar is, the better status the wireless network has or the more effective the wireless network is), so as to avoid a situation that the user misjudges the wireless network signal indicators.

Further, in a fourth embodiment of the invention, the corresponding straight bar of the wireless network signal indicator (for example, the UP indicator) with the feature of the smaller value the better is presented in an opposite way, so as to avoid a situation that the user selects an unsuitable wireless network.

Fourth Embodiment

A hardware device and an operation method of the present embodiment are substantially similar to that of the third embodiment, so that details thereof are not repeated. A difference between the present embodiment and the third embodiment is that in the present embodiment, when a specific indicator in a plurality of the wireless network signal indicators has the feature of the lower value the better (or, the smaller value the better), the control unit 12 of the portable electronic device 10 converts the specific indicator into a negative developing straight bar, and simultaneously displays the negative developing straight bar and the corresponding straight bars of the other wireless network signal indicators. In other words, in the present embodiment, the wireless network signal indicators with the feature of the greater value the better are presented by positive developing straight bars (which is the same to that of the third embodiment), and the wireless network signal indicator with the feature of the smaller value the better is presented by the negative developing straight bar.

Figure 5:
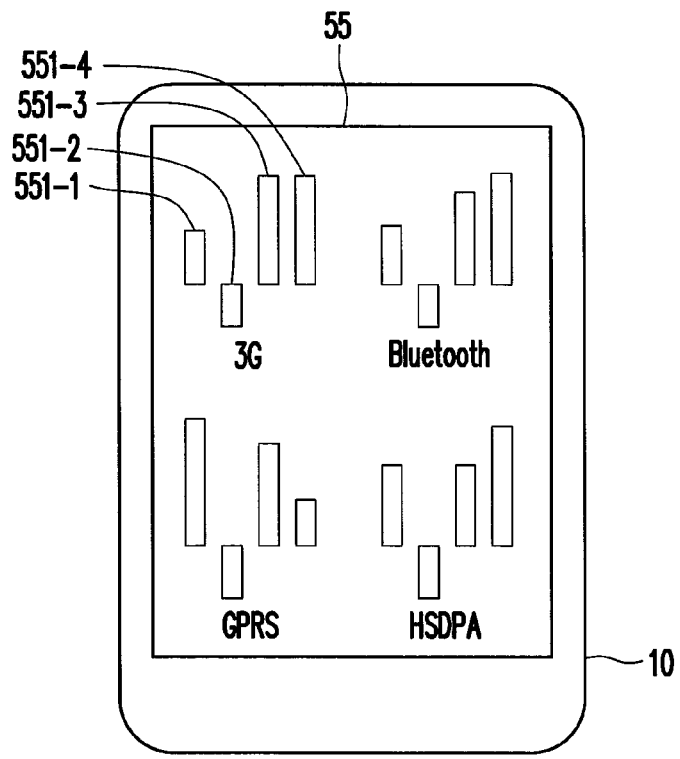
FIG. 5 is a schematic diagram of displaying wireless network signal indicators on a user interface according to a fourth embodiment of the invention.

FIG. 5 is a schematic diagram of displaying wireless network signal indicators on a user interface according to the fourth embodiment of the invention.

Referring to FIG. 5, taking the 3G wireless network as an example, similar to the user interface 45 of FIG. 4, in the user interface 55 of the portable electronic device 10, since the RSSI, BW and SNR indicators of the wireless network are the greater the better, corresponding straight bars 551-1, 551-3 and 551-4 of the RSSI, BW and SNR indicators of 3G are presented by positive developing straight bars. Since the UP indicator of the wireless network is the smaller the better, the corresponding straight bar 551-2 of the UP indicator of 3G is presented by a negative developing straight bar. In this way, the positive developing straight bars and the negative developing straight bars are used to distinguish the wireless network signal indicators of different properties.

Based on the fourth embodiment, in a fifth embodiment of the invention, the positive developing straight bars and the negative developing straight bars are further grouped into different groups, which is describe in detail below.

Fifth Embodiment

A hardware device and an operation method of the present embodiment are substantially similar to that of the fourth embodiment, so that details thereof are not repeated. A difference between the present embodiment and the fourth embodiment is that in the present embodiment, all of the positive developing straight bars and all of the negative developing straight bars are respectively grouped into different groups for presentation.

Figure 6:
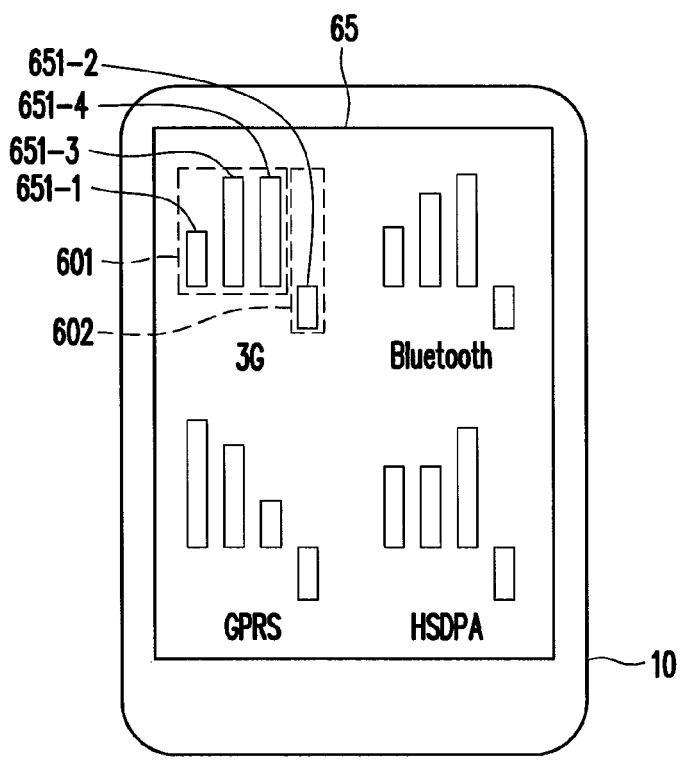
FIG. 6 is a schematic diagram of displaying wireless network signal indicators on a user interface according to a fifth embodiment of the invention.

FIG. 6 is a schematic diagram of displaying wireless network signal indicators on a user interface according to the fifth embodiment of the invention. Referring to FIG. 6, taking the 3G wireless network as an example, in the user interface 65 of the portable electronic device 10, the corresponding straight bars 651-1, 651-3 and 651-4 (for example, belonging to a positive developing straight bar group) of the RSSI, BW and SNR indicators of 3G are displayed in a dashed box region 601. The corresponding straight bar 651-2 (for example, belonging to a negative developing straight bar group) of the UP indicator of 3G is displayed in a dashed box region 602. The wireless network signal indicators displayed in the dashed box region 601 can be respectively regarded as wireless network signal indicators of a first group, and the wireless network signal indicators displayed in the dashed box region 602 can be regarded as wireless network signal indicators of a second group. In this way, all of the positive developing straight bars and all of the negative developing straight bars can be separately displayed through the dashed box region 601 and dashed box region 602, so that the positive developing straight bars and the negative developing straight bars can be easily compared to avoid a situation that magnitudes of the wireless network signal indicators cannot be clearly compared due to that the positive developing straight bars and the negative developing straight bars are displayed in interlace.

It should be noticed that FIG. 6 is only an example of the invention, and in the present embodiment, the wireless network signal indicators with the feature of the greater value the better such as the BW indicator, the RSSI indicator or the SNR indicator, etc. can all be grouped in a group (for example, the positive developing straight bar group) similar to the dashed box region 601, and the wireless network signal indicators with the feature of the smaller value the better such as the BER indicator, the PLR indicator or the UP indicator, etc. can all be grouped in a group (for example, the negative developing straight bar group) similar to the dashed box region 602.

However, the invention is not limited thereto, and in another embodiment of the invention, the control unit 12 of the portable electronic device 10 is not only capable of displaying the wireless network signal indicators of the wireless networks through the above method, but is also capable of recommending the user to select a recommended wireless network to serve as the target wireless network according to predetermined internal operation rules (or a screening method). Moreover, the portable electronic device of the present embodiment can also provide a plurality of operation modes, for example, a semi-manual mode or an automatic mode. For example, under the semi-manual mode, the portable electronic device can prompt the user a recommended wireless network, so that the user can directly select and use the recommended wireless network. Moreover, under the automatic mode, the portable electronic device can automatically select the recommended wireless network for usage.

Sixth Embodiment

A hardware device and an operation method of the present embodiment are substantially similar to that of the fifth embodiment, so that details thereof are not repeated. A difference between the present embodiment and the fifth embodiment is that in the present embodiment, the control unit 12 of the portable electronic device 10 can recommend the user to select a wireless network retained after screening and elimination according to predetermined internal operation rules. For example, the control unit 12 of the portable electronic device 10 can respectively set one or a plurality of decision thresholds and a decision priority sequence corresponding to the wireless network signal indicators. Then, when the portable electronic device 10 is set to the semi-manual mode, the control unit 12 of the portable electronic device 10 sequentially compares the wireless network signal indicators with the one or plural decision thresholds according to the decision priority sequence, so as to obtain a recommended wireless network. Moreover, the control unit 12 of the portable electronic device 10 can display a selection prompt corresponding to the recommended wireless network to facilitate the user selecting the target wireless network according to the selection prompt.

Figure 7:
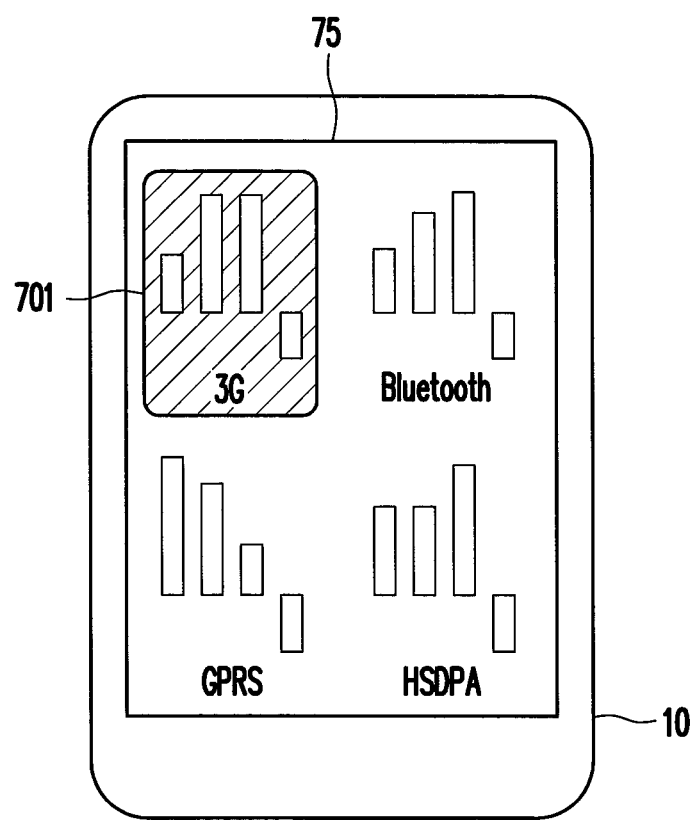
FIG. 7 is a schematic diagram of displaying wireless network signal indicators and a selection prompt on a user interface according to a sixth embodiment of the invention.

FIG. 7 is a schematic diagram of displaying wireless network signal indicators and a selection prompt on a user interface according to the sixth embodiment of the invention. Referring to FIG. 7, in the semi-manual mode, the control unit 12 of the portable electronic device 10 selects a recommended wireless network according to predetermined internal operation rules, and displays a selection prompt 701 corresponding to the recommended wireless network on the user interface 75, where the selection prompt 701 is, for example, presented in ways of highlighting, blinking or flashing, etc., which is not limited by the invention.

Figure 8:
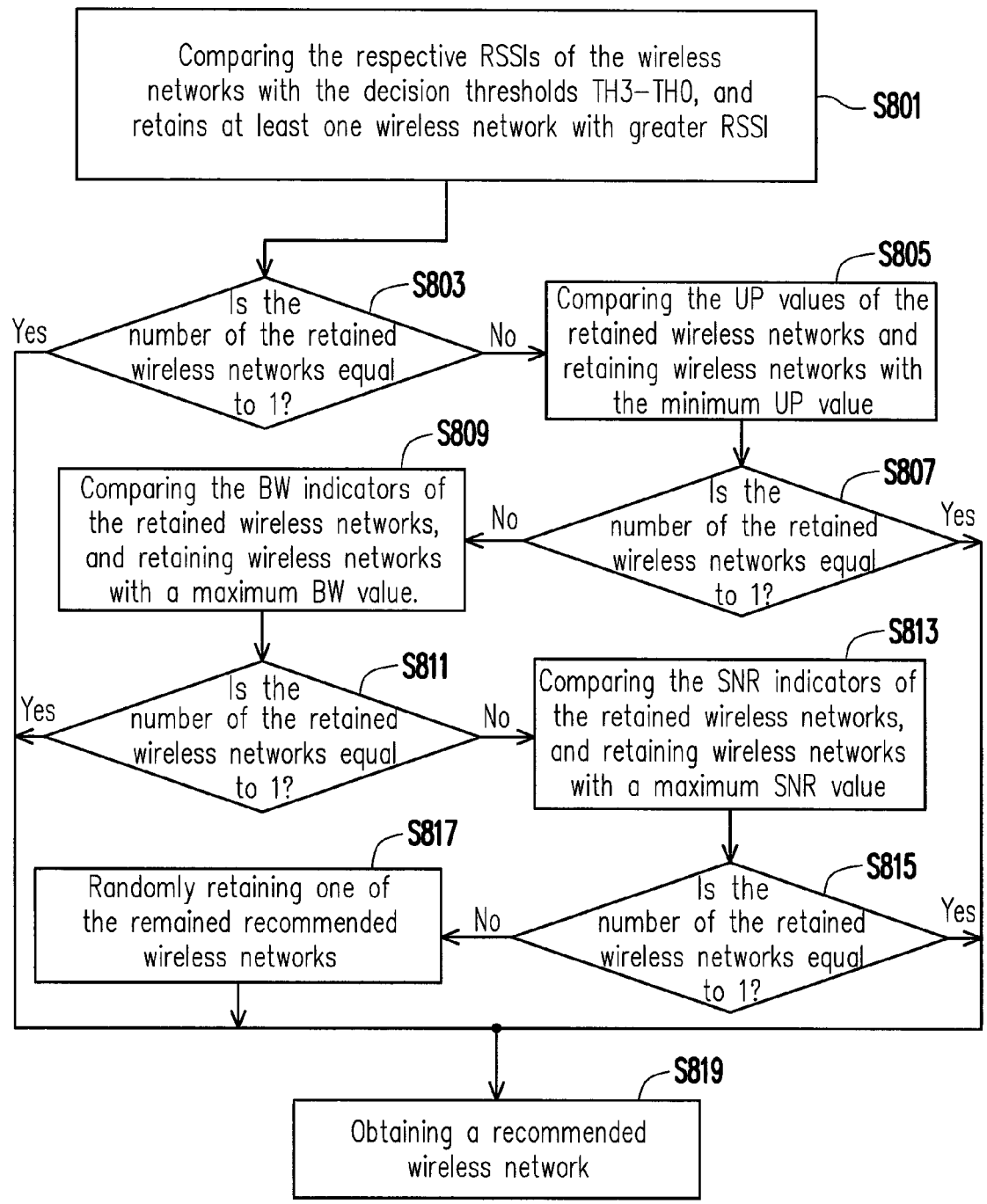
FIG. 8 is a flowchart of selecting a recommended wireless network according to a decision priority sequence and decision thresholds of a table 1.

In detail, in the present embodiment, the internal operation rules used by the control unit 12 of the portable electronic device 10 to select the recommended wireless network from a plurality of wireless networks can be implemented through a following method. Referring to a table 1 and FIG. 8, the table 1 presents decision thresholds and a decision priority sequence corresponding to each of the wireless networks that are set by the control unit 12 of the portable electronic device 10 under the automatic mode, and FIG. 8 is a flowchart of selecting a recommended wireless network according to the decision priority sequence and the decision thresholds of the table 1.

TABLE 1

| Decision priority sequence | Decision threshold |
|---|---|
| (1) RSSI | TH3, TH2, TH1, TH0 |
| (2) UP | UPmin |
| (3) BW | BWmax |
| (4) SNR | SNRmax |

As shown in the table 1, in the present embodiment, the control unit 12 sequentially compares from the RSSI value of each wireless network to the SNR value according to the decision priority sequence. Decision thresholds of the RSSI indicator are TH3-TH0 (TH3>TH2>TH1>TH0), a decision threshold of the UP indicator is UPmin (i.e. a wireless network with a minimum UP value in all of the wireless networks), a decision threshold of the BW indicator is BWmax (i.e. a wireless network with a maximum BW value in all of the wireless networks), and a decision threshold of the SNR indicator is SNRmax (i.e. a wireless network with a maximum SNR value in all of the wireless networks). Moreover, the decision thresholds TH3-TH0 can be preset to serve as a preliminary screening, and the decision thresholds UPmin, BWmax and SNRmax represent a wireless network with the minimum UP value and maximum BW or SNR value in all of the wireless networks. It should be noticed that the decision priority sequence and the decision thresholds of the invention are not limited thereto, which can be suitably adjusted according to an actual design requirement.

Referring to FIG. 8, the wireless network signal indicators of 3G, Bluetooth, GPRS and HSDPA are used as an example for following descriptions. In step S801, when the control unit 12 of the portable electronic device 10 is to select a recommended wireless network from 3G, Bluetooth, GPRS and HSDPA, the portable electronic device 10 first compares the respective RSSIs of the wireless networks with the decision thresholds TH3-TH0 (since the RSSI has a highest decision priority sequence in the table 1), and retains one or plural wireless networks after screening.

For example, a following table 2 presents a comparison result of the RSSI of each wireless network and the decision thresholds TH3-TH0, where the respective RSSIs of 3G, Bluetooth, GPRS and HSDPA are RSSI1-RSSI4.

TABLE 2

| Decision priority sequence | (1) RSSI |
|---|---|
| Decision threshold comparison result | TH3 > RSSI1~RSSI4 > TH2 |
| | TH2 > N/A > TH1 |
| | TH1 > N/A > TH0 |

According to FIG. 2, it is known that after the control unit 12 of the portable electronic device 10 compares the RSSI1-RSSI4 with the decision thresholds TH3-TH0, it is determined that the RSSI1-RSSI4 are all between the decision thresholds TH3 and TH2. Therefore, in step S801, the wireless network options of 3G, Bluetooth, GPRS and HSDPA are all retained, and after the step S801 is completed, a step S803 is executed.

In the step S803, the control unit 12 of the portable electronic device 10 determines whether the number of the retained wireless networks is equal to 1. In this step, if the number of the retained wireless networks is equal to 1, after the step S803 is completed, a step S819 is executed. In the step S803, if the control unit 12 of the portable electronic device 10 determines that the number of the retained wireless networks is not equal to 1, for example, according to the comparison result of the table 2, since all of the wireless networks are retained, after the step S803 is completed, a step S805 is executed.

In the step S805, the control unit 12 of the portable electronic device 10 compares the UP values of the wireless networks and retains one or plural wireless networks with the minimum UP value. Then, after the step S805 is completed, a step S807 is executed. In detail, in the step S805, when the control unit 12 of the portable electronic device 10 receives the wireless network signal indicators of all types of the wireless networks, the control unit 12 of the portable electronic device 10 can count the wireless network signal indicators (for example, the UP indicator) that are grouped into a same group and have the feature of the smaller value the better, and obtain a minimum value of the wireless network signal indicators that are grouped into the same group and have the feature of the smaller value the better.

In the step S807, the control unit 12 of the portable electronic device 10 determines whether the number of the wireless networks retained in the step S805 is equal to 1. If yes, after the step S807 is completed, the step S819 is executed, and if not, since the respective UP values of 3G, Bluetooth, GPRS and HSDPA are the same, none wireless network is screened in the step S805, and 3G, Bluetooth, GPRS and HSDPA are all retained, after the step S807 is completed, a step S809 is executed.

In the step S809, the control unit 12 of the portable electronic device 10 compares the BW indicators of the retained wireless networks, and retains one or plural wireless networks with a maximum BW value. Then, after the step S809 is completed, a step S811 is executed.

In the step S811, the control unit 12 of the portable electronic device 10 determines whether the number of the wireless networks retained in the step S809 is equal to 1. If yes, after the step S811 is completed, the step S819 is executed, and if not, since the respective BW values of 3G, Bluetooth and HSDPA are the same and greater than a BW value of GPRS, only GPRS is screened in the step S809, and 3G, Bluetooth and HSDPA are all retained, after the step S811 is completed, a step S813 is executed.

In the step S813, the control unit 12 of the portable electronic device 10 compares the SNR indicators of the retained wireless networks, and retains one or plural wireless networks with a maximum SNR value. Then, after the step S813 is completed, a step S815 is executed.

In the step S815, the control unit 12 of the portable electronic device 10 determines whether the number of the wireless networks retained in the step S813 is equal to 1. If yes, after the step S815 is completed, the step S819 is executed, and if not, since the respective BW values of 3G and HSDPA are the same and greater than a BW value of Bluetooth, only Bluetooth is screened in the step S813, and 3G and HSDPA are all retained, after the step S815 is completed, a step S817 is executed.

In the step S817, since the predetermined decision procedures (for example, comparison procedures performed according to the values of RSSI, UP, BW and SNR, etc.) have been all executed, and a unique recommended wireless network is still not obtained (the retained wireless networks are 3G and HSDPA). In this step, the control unit 12 of the portable electronic device 10 randomly retains one of the remained recommended wireless networks (3G and HSDPA), for example, retains 3G and screens HSDPA. Then, after the step S817 is completed, the step S819 is executed.

Finally, in the step S819, the control unit 12 of the portable electronic device 10 obtains the unique recommended wireless network (for example, 3G), and displays a selection prompt corresponding to the recommended wireless network. In this way, the user can directly select the target wireless network from one or plural wireless networks for operating therein according to the selection prompt without spending extra efforts to consider the other wireless networks. Alternatively, if the user has other considerations (for example, the user does not care about a level of the UP value, but only cares about the RSSI value), the user may neglects the selection prompt to select other wireless networks. Moreover, descriptions of the step S801 to the step S819 are only examples, which are not used to limit the invention. In other embodiments of the invention, the wireless network signal indicators compared in the step S801, the step S805, the step S809 and the step S813 and a comparison sequence thereof are not limited to be the RSSI values, the UP values, the BW values and the SNR values of the wireless networks.

It should be noticed that in the aforementioned embodiments, when the corresponding straight bars of the wireless network signal indicators are displayed, the control unit 12 of the portable electronic device 10 can respectively display the corresponding straight bars of each wireless network in different colors. Moreover, the control unit 12 of the portable electronic device 10 can also display the corresponding straight bars corresponding to the same wireless network signal indicator of different wireless networks in a same color. For example, taking FIG. 3 as an example, the corresponding straight bars 351-1, 352-1, 353-1 and 354-1 of the RSSI indicator of 3G, Bluetooth, GPRS and HSDPA can all be displayed in a red color, the corresponding straight bars 351-2, 352-2, 353-2 and 354-2 of the UP indicator of 3G, Bluetooth, GPRS and HSDPA can all be displayed in a yellow color, and the color settings of the corresponding straight bars of the BW and SNR indicators can be deduced by analogy.

In the aforementioned embodiments, besides that the wireless network signal indicators are displayed in corresponding straight bars, they can also be displayed in corresponding color points or corresponding color blocks.

Seventh Embodiment

A hardware device and an operation method of the present embodiment are substantially similar to that of the sixth embodiment, so that details thereof are not repeated. A difference between the present embodiment and the sixth embodiment is that in the present embodiment, the wireless signal indicators can be displayed in corresponding color points or corresponding color blocks. In other words, in the present embodiment, regarding each of the wireless networks in the one or plural wireless networks detected by the multi-mode transceiver unit 11 of the portable electronic device 10, the control unit 12 of the portable electronic device 10 converts the wireless network signal indicators thereof into a plurality of corresponding color points or a plurality of corresponding color blocks through calculation or by looking up a corresponding table, and displays the corresponding color points or corresponding color blocks of each of the wireless networks.

Figure 9:
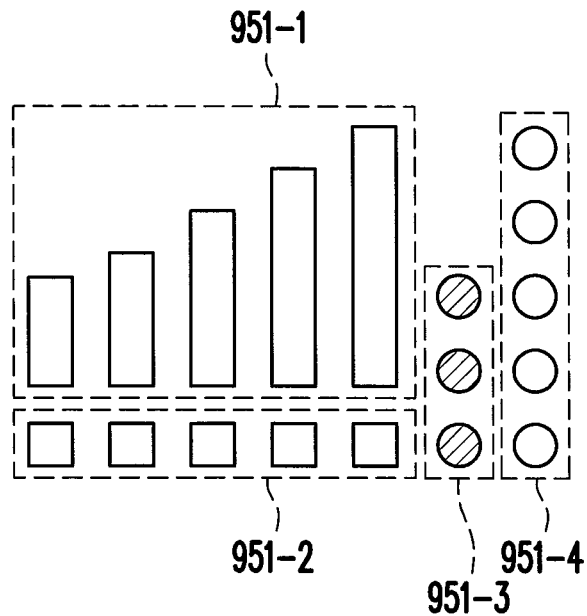
FIG. 9 is a schematic diagram of displaying wireless network signal indicators on a user interface according to a seventh embodiment of the invention.

FIG. 9 is a schematic diagram of displaying wireless network signal indicators on a user interface according to the seventh embodiment of the invention. Generally, FIG. 9 is similar to FIG. 3-FIG. 7, and a difference there between is that in FIG. 9, the RSSI, UP, BW and SNR indicators of the wireless networks are presented by color points or color blocks, and only the wireless network signal indictors of 3G are taken as an example for descriptions.

Referring to FIG. 9, the RSSI, UP, BW and SNR indicators of 3G are respectively presented by color blocks or color points in dashed box regions 951-1~951-4. For example, the dashed box region 951-1 represent a strength of the RSSI indicator (similar to a presenting method of a general signal strength), and the stronger the RSSI indicator is, the more the corresponding color blocks are.

Eighth Embodiment

A hardware device and an operation method of the present embodiment are substantially similar to that of any one of the first embodiment to the sixth embodiment, so that details thereof are not repeated. A difference between the present embodiment and the first to the sixth embodiments is that in the present embodiment, the wireless signal indicators can be displayed in a radar chart. In other words, in the present embodiment, regarding each of the wireless networks in the one or plural wireless networks, the control unit 12 of the portable electronic device 10 converts the wireless network signal indicators thereof into a plurality of linear values through calculation or by looking up a corresponding table, and displays the linear values corresponding to each of the wireless networks in a radar chart.

Figure 10:
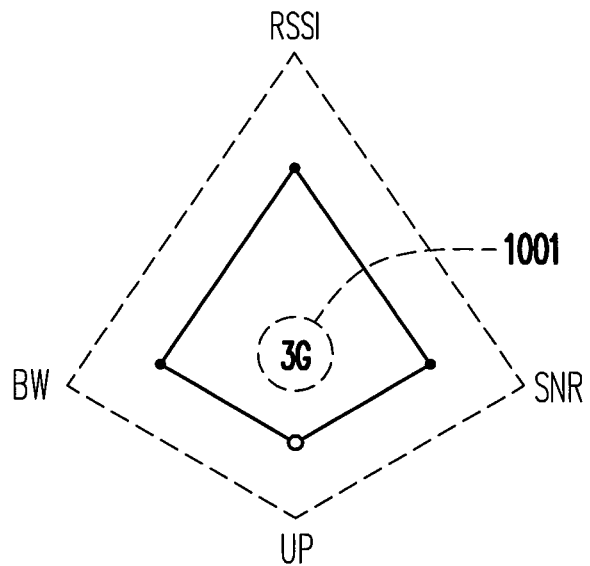
FIG. 10 is a schematic diagram of displaying wireless network signal indicators on a user interface according to an eighth embodiment of the invention.

FIG. 10 is a schematic diagram of displaying wireless network signal indicators on a user interface according to the eighth embodiment of the invention.

Generally, FIG. 9 and FIG. 10 are variations of the embodiments of FIG. 3-FIG. 7, and a difference there between is only that the RSSI, UP, BW and SNR indicators of the wireless networks are presented by a radar chart in FIG. 10, so that only the wireless network signal indicators of 3G are taken as an example for descriptions.

Referring to FIG. 10, signal strengths can be determined according to distances between the RSSI, UP, BW and SNR indicators of 3G and a center point 1001. In other words, the greater the distance between a wireless network signal indicator and the center point 1001 is, the greater the strength or the value thereof is.

It should be noticed that the seventh embodiment and the eighth embodiment are only used to describe that the wireless network signal indicators displayed on the user interface can be substantially presented to the user through any pattern, and the above two embodiment are not used to limit the invention.

Ninth Embodiment

A hardware device and an operation method of the present embodiment are substantially similar to that of the sixth embodiment, so that details thereof are not repeated. A difference between the present embodiment and the sixth embodiment is that in the present embodiment, when the portable electronic device 10 is in the automatic mode, the control unit 12 of the portable electronic device 10 may obtain a recommended wireless network according to internal operation rules similar to that of the sixth embodiment, and automatically takes the recommended wireless network as the target wireless network. In this way, the control unit 12 of the portable electronic device 10 can automatically select the target wireless network (i.e. the unique recommended wireless network) from one or plural wireless networks for operating therein without assistance of any manual operation.

According to the above descriptions, in the automatic mode, in order to still retain the user's discretion to decide whether to accept the recommended wireless network screened by the control unit 12 of the portable electronic device 10, in another embodiment of the invention, the user can perform a confirmation or cancel operation to accept or reject the recommended wireless network automatically screened by the portable electronic device 10.

Tenth Embodiment

A hardware device and an operation method of the present embodiment are substantially similar to that of the ninth embodiment, so that details thereof are not repeated. A difference between the present embodiment and the ninth embodiment is that in the present embodiment, when the portable electronic device 10 is in the automatic mode, after the control unit 12 of the portable electronic device 10 obtains the unique recommended wireless network according to the internal operation rule, the recommended wireless network is not immediately taken as the target wireless network. The control unit 12 of the portable electronic device 10 first determines whether or not a confirmation operation or a cancel operation (an operation command sent by the user) is received. When the control unit 12 of the portable electronic device 10 receives the confirmation operation of the user, the control unit 12 takes the recommended wireless network as the target wireless network. Moreover, when the control unit 12 of the portable electronic device 10 receives the cancel operation of the user, the control unit 12 cancels the operation of selecting the recommended wireless network as the target wireless network, and the control unit 12 further selects another recommended wireless network (excluding the deselected wireless network). Moreover, in some applications, to ensure execution integrity of a system program, when the control unit 12 of the portable electronic device 10 waits over a predetermined time, the control unit 12 can directly takes the obtained recommended wireless network as the target wireless network.

In other words, in the present embodiment, the user still retains final discretion of whether to accept the recommended wireless network as the target wireless network.

Eleventh Embodiment

A hardware device and an operation method of the present embodiment are substantially similar to that of any one of the first to the tenth embodiments, so that details thereof are not repeated. A difference between the present embodiment and the first to the tenth embodiments is that in the present embodiment, corresponding to the UP indicator, the portable electronic device can display a unit operation price of the current used target wireless network.

Figure 11:
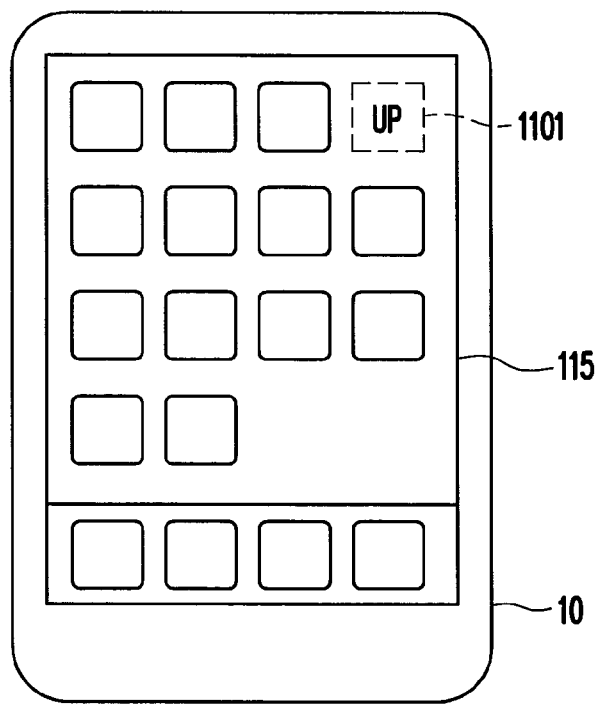
FIG. 11 is a schematic diagram of displaying a unit operation price of a currently used target wireless network on a user interface according to an eleventh embodiment of the invention.

FIG. 11 is a schematic diagram of displaying a unit operation price of the currently used target wireless network on a user interface according to the eleventh embodiment of the invention.

Referring to FIG. 11, dashed box region 1101 in the user interface 115 of the portable electronic device 10 displays a unit operation price of the target wireless network currently used by the portable electronic device. In this way, the user can control a time of using the target wireless network according to the unit operation price, so as to avoid excessively using the target wireless network to increase unnecessary wireless network access charges.

According to the above description, by extending the concept of controlling the usage unit price of the wireless network, in a twelfth, under a predetermined wireless network usage limit, the control unit 12 of the portable electronic device 10 may display an available time before reaching the predetermined limit on the user interface. Alternatively, the control unit 12 of the portable electronic device 10 may display an available amount of packet upload/download amount on the user interface.

Twelfth Embodiment

A hardware device and an operation method of the present embodiment are substantially similar to that of any one of the first to the tenth embodiments, so that details thereof are not repeated. A difference between the present embodiment and the first to the tenth embodiments is that in the present embodiment, according to a predetermined wireless network usage limit (which is generally determined by a monthly charge or a prepayment), the control unit 12 of the portable electronic device 10 may display an operation time threshold of the currently used target wireless network on the user interface. Moreover, the control unit 12 of the portable electronic device 10 may display an accumulated time of data transmission performed through the target wireless network on the user interface.

Figure 12:
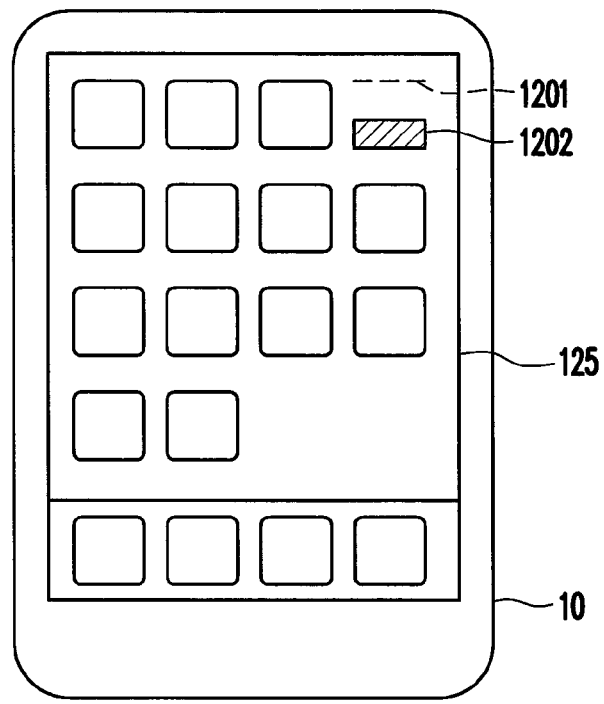
FIG. 12 is a schematic diagram of displaying an operation time threshold and an accumulated time of data transmission corresponding to a currently used target wireless network on a user interface according to a twelfth embodiment of the invention.

FIG. 12 is a schematic diagram of displaying an operation time threshold and an accumulated time of data transmission corresponding to a currently used target wireless network on a user interface according to the twelfth embodiment of the invention.

Referring to FIG. 12, the user interface 125 of the portable electronic device 10 displays an operation time threshold corresponding to the currently used target wireless network and an accumulated time of data transmission performed through the target wireless network, where a dash line 1201 represents the operation time threshold, and a block with slash background 1202 represents the currently accumulated time of data transmission performed through the target wireless network. For example, when the block with slash background 1202 ascends to the dash line 1201, it represents that the usage limit of the target wireless network currently used by the portable electronic device is reached, and if the target wireless network is continuously used, the user has to pay for extra charges. In this way, the user can also control a time of using the target wireless network according to the operation time threshold and the accumulated time of data transmission, so as to avoid excessively using the target wireless network to increase unnecessary wireless network access charges.

On the other hand, in view of user's payment, in a thirteenth embodiment of the invention, the control unit 12 of the portable electronic device 10 may display a total accumulated cost for using the target wireless network.

Thirteenth Embodiment

A hardware device and an operation method of the present embodiment are substantially similar to that of any one of the first to the tenth embodiments, so that details thereof are not repeated. A difference between the present embodiment and the first to the tenth embodiments is that in the present embodiment, according to the aforementioned UP indicator, the control unit 12 of the portable electronic device 10 can display a unit operation price of the currently used target wireless network on the user interface. Moreover, the control unit 12 of the portable electronic device 10 can display a total accumulated cost of data transmission performed through the target wireless network on the user interface.

Figure 13:
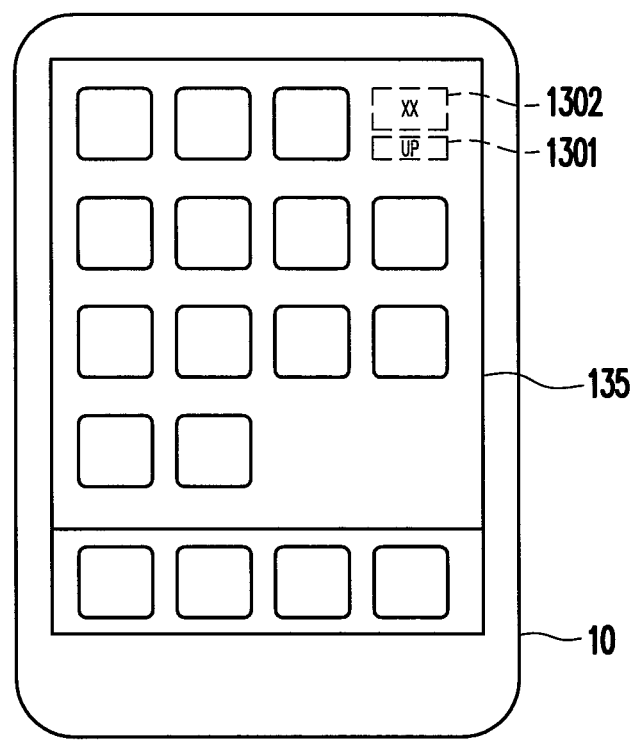
FIG. 13 is a schematic diagram of displaying a unit operation price and a total accumulated cost corresponding to a currently used target wireless network on a user interface according to a thirteenth embodiment of the invention.

FIG. 13 is a schematic diagram of displaying a unit operation price and a total accumulated cost corresponding to a currently used target wireless network on a user interface according to the thirteenth embodiment of the invention. Referring to FIG. 13, the user interface 135 of the portable electronic device 10 displays a unit operation price and a total accumulated cost corresponding to the currently used target wireless network. In detail, a dashed box region 1301 represents the unit operation price of the currently used target wireless network, and a dashed box region 1302 represents the total accumulated cost calculated according to the unit operation prices of the currently used target wireless network up to now. In this way, the user can also control a time of using the target wireless network according to the unit operation prices and the total accumulated cost, so as to avoid excessively using the target wireless network to increase unnecessary wireless network access charges.

In summary, in the method for selecting a wireless network and the portable electronic device provided by a plurality of embodiments of the invention, a plurality of the wireless network signal indicators corresponding to a plurality of heterogeneous wireless networks can be displayed on the user interface, where the wireless network signal indicators can be presented through straight bars, color blocks, color points or a radar chart. Moreover, the user can select to operate the portable electronic device in a target wireless network according to the wireless network signal indicators. In this way, the user can make a decision between the wireless network signal indicators and expected service quality according to an own habit of using the portable electronic device, and select a suitable wireless network for usage. Moreover, the embodiments of the invention provide a plurality of operation modes for the user to select, which may greatly improve usage flexibility of the portable electronic device using the wireless network.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for selecting a wireless network, adapted to a portable electronic device, and comprising:
    detecting a plurality of wireless network signal indicators of a plurality of wireless networks, wherein a network feature presented by one of the wireless network signal indicators is different from the network feature presented by another one of the wireless network signal indicators;
    selecting a target wireless network from the plurality of wireless networks for operating therein according to the wireless network signal indicators; and
    respectively displaying the wireless network signal indicators of the wireless networks on a user interface for selecting the target network,
    wherein the step of respectively displaying the wireless network signal indicators comprises:
        when a specific indicator in the wireless network signal indicators is a unit price (UP) indicator, converting the specific indicator into a negative developing straight bar, and simultaneously displaying the negative developing straight bar and at least one corresponding straight bar of the other wireless network signal indicators.

2. The method for selecting the wireless network as claimed in claim 1, wherein the step of respectively displaying the wireless network signal indicators of the wireless networks on the user interface further comprises:
    regarding each of the wireless networks, respectively converting the wireless network signal indicators corresponding to each of the wireless networks into a plurality of corresponding straight bars through calculation or by looking up a corresponding table, and displaying the corresponding straight bars of each of the wireless networks.

3. The method for selecting the wireless network as claimed in claim 2, wherein the step of displaying the corresponding straight bars of each of the wireless networks comprises:
    displaying the corresponding straight bars of each of the wireless networks in different colors.

4. The method for selecting the wireless network as claimed in claim 2, wherein the step of displaying the corresponding straight bars of each of the wireless networks comprises:
    displaying the corresponding straight bars corresponding to the same wireless network signal indicator among the wireless network signal indicators of different wireless networks in a same color.

5. The method for selecting the wireless network as claimed in claim 1, wherein the step of respectively displaying the wireless network signal indicators of the wireless networks on the user interface comprises:
    regarding each of the wireless networks, respectively converting the wireless network signal indicators corresponding to each of the wireless networks into a plurality of corresponding color points or a plurality of color blocks through calculation or by looking up a corresponding table, and displaying the corresponding color points or color blocks of each of the wireless networks.

6. The method for selecting the wireless network as claimed in claim 1, wherein the step of respectively displaying the wireless network signal indicators of the wireless networks on the user interface comprises:
    regarding each of the wireless networks, respectively converting the wireless network signal indicators corresponding to each of the wireless networks into a plurality of linear values through calculation or by looking up a corresponding table, and displaying the linear values corresponding to each of the wireless networks in a radar chart.

7. The method for selecting the wireless network as claimed in claim 1, wherein the step of selecting the target wireless network from the wireless networks for operating therein according to the wireless network signal indicators comprises:
    receiving a selection operation; and
    selecting to operate in the target wireless network according to the selection operation.

8. The method for selecting the wireless network as claimed in claim 1, wherein the step of selecting the target wireless network from the wireless networks for operating therein according to the wireless network signal indicators comprises:
    respectively setting at least one decision threshold and a decision priority sequence corresponding to the wireless network signal indicators; and
    sequentially comparing the wireless network signal indicators with the at least one decision threshold according to the decision priority sequence, so as to obtain at least one recommended wireless network.

9. The method for selecting the wireless network as claimed in claim 8, wherein the step of sequentially comparing the wireless network signal indicators with the at least one decision threshold according to the decision priority sequence, so as to obtain the at least one recommended wireless network comprises:

randomly retaining one of the recommended wireless networks when a number of the obtained at least one recommended wireless network is greater than one.

10. The method for selecting the wireless network as claimed in claim 9, further comprising:
    displaying a selection prompt corresponding to the recommended wireless network in a semi-manual mode.

11. The method for selecting the wireless network as claimed in claim 9, wherein the step of selecting the target wireless network from the at least one wireless networks for operating therein according to the wireless network signal indicators comprises:
    receiving a confirmation operation or a cancel operation in an automatic mode;
    selecting the recommended wireless network as the target wireless network when the confirmation operation is received; and
    canceling the operation of selecting the recommended wireless network as the target wireless network when the cancel operation is received.

12. The method for selecting the wireless network as claimed in claim 1, wherein after the step of selecting to operate in the target wireless network, the method further comprises:
    displaying an operation time threshold corresponding to the target wireless network; and
    displaying an accumulated time of data transmission performed through the target wireless network.

13. The method for selecting the wireless network as claimed in claim 1, wherein after the step of selecting to operate in the target wireless network, the method further comprises:
    displaying a unit operation price of the currently used target wireless network.

14. The method for selecting the wireless network as claimed in claim 13, wherein after the step of selecting to operate in the target wireless network, the method further comprises:
    displaying a total accumulated cost of data transmission performed through the target wireless network.

15. The method for selecting the wireless network as claimed in claim 1, wherein the wireless networks comprise at least one of third generation wireless communication technique (3G), Bluetooth, general packet radio service (GPRS), high speed downlink packet access (HSDPA), high speed uplink packet access (HSUPA), radio frequency identification (RFID), wireless-fidelity (Wi-Fi) and third generation partnership project long term evolution (3GPP LTE) technique.

16. The method for selecting the wireless network as claimed in claim 1, wherein the wireless network signal indicators further comprise a bandwidth (BW) indicator, a received signal strength indicator (RSSI), a signal-to-noise ratio (SNR) indicator, a bit error rate (BER) indicator, or a packet loss rate (PLR) indicator.

17. The method for selecting the wireless network as claimed in claim 16, wherein the bandwidth indicator, the received signal strength indicator or the signal-to-noise ratio indicator are included in a first indicator group, and the bit error rate indicator, the packet loss rate indicator or the unit price indicator are included in a second indicator group.

18. A portable electronic device, comprising:
    a multi-mode transceiver unit, detecting a plurality of wireless network signal indicators of a plurality of wireless networks, wherein a network feature presented by one of the wireless network signal indicators is different from the network feature presented by another one of the wireless network signal indicators;
    a control unit, coupled to the multi-mode transceiver unit, and controlling the multi-mode transceiver unit to select a target wireless network from the plurality of wireless networks for operating therein according to the wireless network signal indicators; and
    a display unit, coupled to the control unit, and displaying a user interface,
    wherein the control unit displays the wireless network signal indicators on the user interface for selecting the target wireless network, and
    when a specific indicator in the wireless network signal indicators is a unit price (UP) indicator, the control unit converts the specific indicator into a negative developing straight bar and simultaneously displays the negative developing straight bar and at least one corresponding straight bar of the other wireless network signal indicators.

19. The portable electronic device as claimed in claim 18, further comprising:
    an input unit, receiving a selection operation, and transmitting the selection operation to the control unit,
    wherein the control unit selects to operate in the target wireless network according to the selection operation.

20. The portable electronic device as claimed in claim 18, wherein the control unit respectively sets at least one decision threshold and a decision priority sequence corresponding to the wireless network signal indicators, and
    the control unit sequentially compares the wireless network signal indicators with the at least one decision threshold according to the decision priority sequence, so as to obtain at least one recommended wireless network.

21. The portable electronic device as claimed in claim 20, wherein when a number of the obtained at least one recommended wireless network is greater than one, the control unit randomly retains one of the recommended wireless networks.

22. The portable electronic device as claimed in claim 21, wherein the control unit controls the display unit to display a selection prompt corresponding to the recommended wireless network in a semi-manual mode.

23. The portable electronic device as claimed in claim 21, wherein when the control unit receives a confirmation operation in an automatic mode, the control unit controls the multi-mode transceiver unit to select the recommended wireless network as the target wireless network, and
    when the control unit receives a cancel operation in the automatic mode, the control unit controls the multi-mode transceiver unit to cancel the operation of selecting the recommended wireless network as the target wireless network.

24. The portable electronic device as claimed in claim 18, wherein the wireless networks comprise at least one of third generation wireless communication technique (3G), Bluetooth, general packet radio service (GPRS), high speed downlink packet access (HSDPA), high speed uplink packet access (HSUPA), radio frequency identification (RFID), wireless-fidelity (Wi-Fi) and third generation partnership project long term evolution (3GPP LTE) technique.

25. The portable electronic device as claimed in claim 18, wherein the wireless network signal indicators further comprise a bandwidth (BW) indicator, a received signal strength indicator (RSSI), a signal-to-noise ratio (SNR) indicator, a bit error rate (BER) indicator, or a packet loss rate (PLR) indicator.

26. The portable electronic device as claimed in claim 25, wherein the bandwidth indicator, the received signal strength indicator or the signal-to-noise ratio indicator are included in a first indicator group, and the bit error rate indicator, the packet loss rate indicator or the unit price indicator are included in a second indicator group.

* * * * *